(12) United States Patent
Huckestein

(10) Patent No.: US 6,468,421 B2
(45) Date of Patent: Oct. 22, 2002

(54) BAG FILTER WASH-DOWN SYSTEM WITH VACUUM BREAK PULSE

(76) Inventor: James E. Huckestein, 766 Riverforest Dr., Freeport, PA (US) 16229

( * ) Notice: Subject to any disclaimer, the term of this patent is extended or adjusted under 35 U.S.C. 154(b) by 0 days.

(21) Appl. No.: 09/738,740

(22) Filed: Dec. 15, 2000

(65) Prior Publication Data

US 2001/0002006 A1 May 31, 2001

Related U.S. Application Data

(63) Continuation-in-part of application No. 09/442,318, filed on Nov. 22, 1999, now abandoned.

(51) Int. Cl.⁷ ........................... B01D 29/19; B01D 29/66
(52) U.S. Cl. ......................... 210/106; 210/90; 210/120; 210/134; 210/140; 210/304; 210/409; 210/457; 210/483
(58) Field of Search ................................. 210/791, 741, 210/90, 106, 120, 134, 138, 143, 140, 302, 304, 407, 409, 410, 483, 512.1, 455, 457, 448, 452, 139; 209/379

(56) References Cited

U.S. PATENT DOCUMENTS 3,511,374 A * 5/1970 Beal ........................... 209/258
3,633,753 A * 1/1972 Petitjean ..................... 210/356
4,284,500 A * 8/1981 Keck .......................... 209/250
4,655,910 A * 4/1987 Tabor ......................... 210/107
5,490,924 A * 2/1996 Macia et al. ............. 210/257.1
5,620,596 A * 4/1997 Engdahl et al.

* cited by examiner

Primary Examiner—Joseph W. Drodge
Assistant Examiner—Terry K. Cecil
(74) Attorney, Agent, or Firm—Carothers & Carothers

(57) ABSTRACT

A filtering assembly for removing particles from a liquid is positioned coaxially within a vertical, pressure-tight housing 11 having a tangential inlet 21 at an upper end and an outlet 24 at a bottom end thereof. The filtering assembly includes a filter bag 13 positioned on the exterior surface of a perforated cylinder 14. Untreated liquid from the inlet is filtered as it flows radially inward through the filter assembly. A wash-down device 28 is position at an upper end of the housing for removing solids that have built up on the exterior surface of the filter bag. A controller initiates a wash-down of the filter bag upon detecting a predetermined pressure differential across the filter assembly. After closing the inlet and outlet, the controller opens a vacuum-break valve D causing the filter bag to pulse and thereby initially dislodging entrapped solid particles for easy wash-down.

7 Claims, 2 Drawing Sheets

BAG FILTER WASH-DOWN SYSTEM WITH VACUUM BREAK PULSE

CROSS REFERENCE

This application is a continuation-in-part of U.S. application Ser. No. 09/442,318, filed Nov. 22, 1999 now abandoned.

BACKGROUND OF THE INVENTION

The present invention pertains to filtering, and more particularly to a filter for filtering solid particles from liquids, and which is further provided with a system for washing down the filter periodically with the use of automated sensors and controls.

In many industrial processes it is necessary to handle finely divided particulate materials. It is often necessary to be able to clarify and filter solid particles from liquids, for example in cooling tower systems, ozone based systems that use chemical treatment, and ozone treatment or a combination.

There are many filtering devices designed to remove particulate material from such liquids. For example, sand filters are used but they are impractical due to the long down time required to clean the filters and due the continued absorption of ozone because of incomplete washing of the sand in sand filters.

The same problem is also encountered with conventional bag filters and the like. The down time for cleaning such filters is excessive, expensive and laborious, and in addition, such filters do not provide any means for determining when filter cleaning is required. Such systems also generally use a backwash system for cleaning which may use previously chemically or ozone treated water for cleaning the filter.

It is a principal object of the present invention to provide a filtering apparatus for removing solid particles from a liquid which incorporates apparatus for automatically detecting when filter cleaning is required, and also automatically initiates and concludes the filter cleaning process without the required attendance of maintenance personnel.

SUMMARY OF THE INVENTION

The filtering apparatus of the present invention for removing solid particles from liquid includes a pressure-tight cylindrical housing with a filter assembly coaxially mounted in the housing. A cylindrical filtering surface, such as a fabric bag filter, is provided on the filter assembly and the filter assembly has an internal liquid passage for downward egress or draining of filtered liquid.

A liquid inlet is provided at the upper end of the housing and is preferably made tangential to the housing for imparting swirling cyclonic movement of the liquid to be filtered within the cylindrical housing.

A liquid outlet is provided at the bottom of the filter assembly for draining filtered liquid from the filter assembly internal passage through a bottom portion of the housing. A drain is also provided in the lower end of the housing for draining off accumulated solids from the housing exteriorly of the filter assembly.

A wash-down apparatus is provided in the upper end of the housing for directing a wash liquid, such as water, under pressure against the filtering surface for washing the filtering surface down. In addition, a pressure differential sensor control is connected for sensing pressure differential between the interior of the housing and the outlet passage. This pressure differential sensor control is operable for closing the inlet and outlet passages of the filtering apparatus, opening the bottom drain in the housing and for also initiating the wash-down apparatus when a predetermined pressure differential is attained. The wash-down process is timed and when completed the process is automatically reversed to continue normal filtering operation of the filtering apparatus for filtering liquids.

An additional feature of the filtering apparatus of the present invention is the inclusion of a vacuum break valve connected for providing exterior air to the interior of the housing when the vacuum break valve is opened. The aforedescribed pressure differential sensor is also operable to open this vacuum break valve after first closing the inlet and outlet passages for the filtering apparatus.

The opening of this vacuum break valve breaks the vacuum normally provided within the filter housing and permits a large ingress of exterior air of higher pressure. This causes the filter fabric bag, which is supported on a perforated cylinder, to literally jump or pulse off of the supporting perforated cylindrical surface, which causes the solid particles entrapped in the filter fabric to be loosened and more easily and readily washed down by the wash-down apparatus.

To assist in this vacuum break function, the filter assembly preferably includes a standoff support disposed on the exterior of the perforated vertical cylinder whereby the filter bag fabric is disposed over the standoff support and the perforated cylinder on which it is mounted such that at least portions of the filter fabric are prevented from contacting the perforated cylinder. When the vacuum break is initiated this causes the pulsing of the filter fabric to be greatly exaggerated or accentuated whereby the initial loosening of solid particles entrapped in the filter fabric is also accentuated for better effect. The standoff support may be constructed of, or include, a series of heavy debris expulsion rods that are annularly spaced about the exterior of the perforated cylinder with their axis aligned in parallel with the axis of the cylinder. These rods also further serve to break up larger particles as they rotate around these rods.

The timer mechanism is connected for timing out the wash-down cycle and disengages the wash-down apparatus and closes the drain and the vacuum break valves and opens the inlet and outlet valves for the filtering apparatus to reestablish normal water filtering after a predetermined wash-down time.

The filtering apparatus of the present invention is also be provided with an automatic air vent valve connected to the inlet for venting entrapped air in the inlet line, so that the filter vessel can vent off entrapped air before going back on line.

BRIEF DESCRIPTION OF THE DRAWINGS

Other objects and advantages appear hereinafter in the following description and claims. The drawings show, for the purpose of exemplification, without limiting the invention or appended claims, certain practical embodiments of the present invention wherein:

DETAILED DESCRIPTION OF A PREFERRED EMBODIMENT

Figure 1:
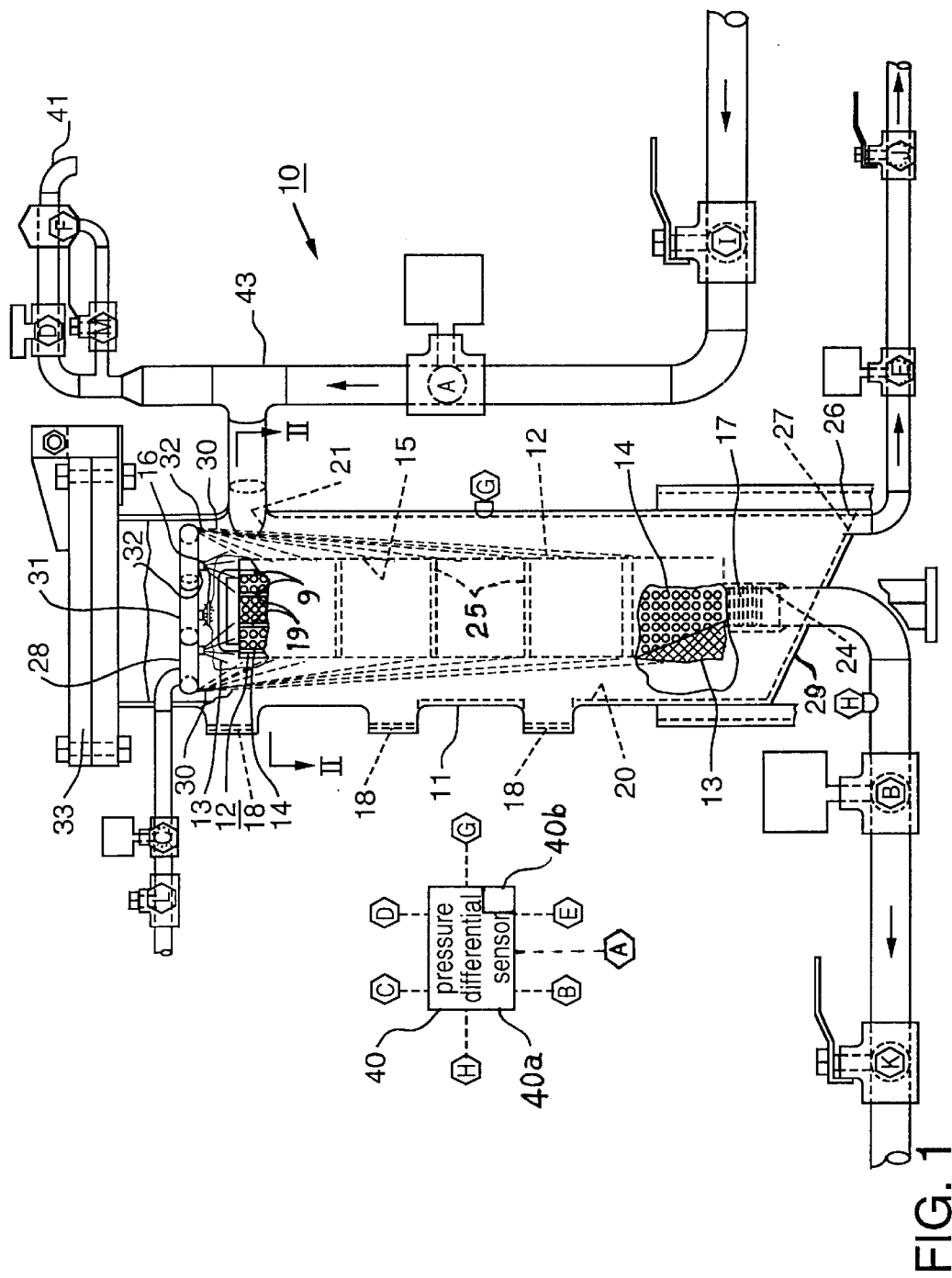
FIG. 1 is a schematic view in side elevation of the filtering apparatus of the present invention with portions of the housing for the filtering apparatus removed for exposure of the interior.
Figure 2:
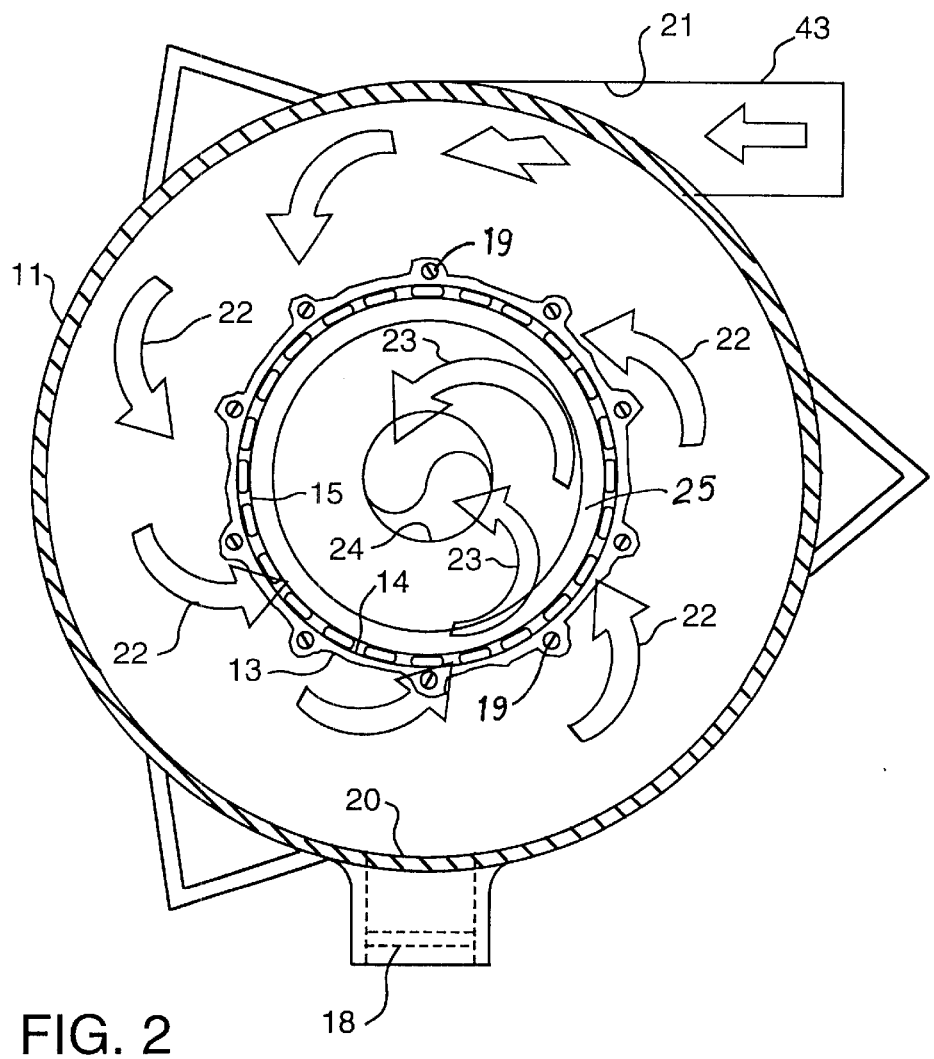
FIG. 2 is an enlarged schematic diagram of the filter housing and interior filtering assembly as seen along section line II—II of FIG. 1.

Referring to FIGS. 1 and 2, the filtering apparatus 10 of the present invention includes a pressure-tight cylindrical housing 11 and a filter assembly 12 coaxially mounted in housing 11 and having a cylindrical filtering surface 13 thereon in the form of a filter fabric supported on a perforated cylinder 14. Filter assembly 12 is also provided with an internal liquid passage 15. Fabric filter 13 is a bag filter tied onto the filter assembly 12 at opposite ends as indicated at 16 and 17. Cylinder 14 is provided with vertically spaced interior support rings 25 which prevent cylinder 14 from collapsing under high pressure filtering.

The housing 11 is also provided with visual inspection sealed glass ports 18 for viewing the condition of the filter fabric 13 and the interior 20 of housing 11.

A liquid inlet 21 into housing 11 is provided adjacent the upper end of filter assembly 12.

As is best seen in FIG. 2, liquid inlet 21 is tangential to the interior 20 of housing 11 for imparting a swirling cyclonic movement of liquid to be filtered within housing 11 as indicated by arrows 22. The swirling cyclonic movement of liquid forces the larger and heavier debris in the fluid to the exterior of the vessel housing whereby it falls to the bottom of the vessel. This helps in preventing the filter media from coming prematurely clogged or plugged with the larger and heavier debris.

The liquid being filtered then passes through filter fabric 13 and perforated cylinder 14 into internal liquid passage 15 where it continues to swirl downwardly as indicated by arrows 23 to bottom outlet 24 for draining the filtered liquid from the filter assembly 12 internal passage 15 through a bottom portion 25 of housing 11.

Bottom portion 29 of housing 11 is sloped to entrain solid particles or sediment to the lower end 26 of housing 11 for draining off the accumulated solids through bottom drain 27.

A wash-down apparatus 28 is provided at the upper end of sealed housing 11 for directing a wash-down liquid, such as water, under pressure against exterior filtering surface 13 for washing the filtering surface down as indicated by conventional high pressure water spray nozzles 32. The wash-down apparatus 28 is provided in the form of ring shower 31 having an annular series of nozzles 32 for directing the wash liquid 30 under pressure against the fabric filtering surface 13.

The upper end 33 of housing 11 is bolted onto the top of the housing 11 as illustrated and sealed with a gasket to housing 11 in order to provide interior access to the housing 11 when required for maintenance, as for example, when it is required to substitute a new filter bag 13.

Pressure differential sensor controller 40 is connected for sensing pressure differential between the interior of housing 11 at connection G and the outlet passage 24 at connection H. When pressure differential sensor 40a of controller 40 senses a predetermined pressure differential threshold, pressure differential sensor controller 40 then closes inlet valve A, and outlet valve B, and opens drain valve E, and inlet valve C, to initiate wash-down apparatus 28.

Vacuum break valve D is also opened by pressure differential sensor controller 40 after inlet valve A and outlet valve B have been closed to thereby close the corresponding inlet and outlet passages 21 and 24. This causes the vacuum seal within housing 11 to break by an intense surge of air rushing into inlet 21 from pipe 41.

This immediate surge of air into chamber 11 causes the filter fabric 13 to literally pulse or jump off its underlying perforated cylinder 14. This action causes the filter fabric 13 to loosen particles entrapped within its fabric weave for easier wash-down by wash-down apparatus 28.

In order to enhance this reaction for a maximum pulse or jump of the filter fabric 13 off of underlying perforated cylinder support 14, a standoff support 19 is disposed on the exterior of perforated vertical cylinder 14 whereby portions of the filter fabric 13 are prevented from engaging or contacting the outer cylindrical surface of perforated support cylinder 14. In FIG. 1, this standoff support 19 is provided in the form of a series of heavy debris expulsion rods 9 which are annularly spaced about the exterior of cylinder 14 in parallel with the axis of cylinder 14. These rods 9 extend for the entire length of cylinder 14. However, in FIG. 1, their full extension is not shown at the bottom of cylinder 14 for clarity.

Pressure differential sensor controller 40 further includes a timer mechanism 40b which is connected therein for disengaging the wash-down apparatus 28 and closing vacuum break valve D, drain valve E, and opening inlet and outlet valves A and B, and by further also closing wash-down inlet valve C for thereby reestablishing normal water filtering after a predetermined wash-down time.

Automatic air vent valve F is provided to automatically vent air entrapped in the filter vessel housing 11, inlet 21 and inlet pipe 43.

Manual valves I, J, K, L and M are provided only as additional operational valves for service type use when required.

The control system for the filtering apparatus 10 of the present invention is fully provided in the pressure differential sensor controller 40 and consists of conventional electronics providing a digital control system which can be read remotely on an operator's computer screen if desired.

It should also be noted that an additional optional pump may be required to be provided on the inlet line 43 for pumping in the liquid to be filtered in order to provide the necessary pressure drop across the liquid filter assembly 12 in order to provide proper functioning of the pressure differential sensing by the pressure differential sensor controller 40.

I claim:

1. A filtering apparatus for removing solid particles from a liquid, comprising in combination:

(a) a substantially vertical, pressure-tight cylindrical housing having upper and lower ends;

(b) a filter assembly coaxially mounted within an interior of said housing, said filter assembly comprising a perforated cylinder and a flexible fabric filter, said perforated cylinder having an inner circumferential surface defining an internal filtered liquid passage and an outer circumferential surface supporting said flexible fabric filter thereon;

(c) a liquid inlet in said housing adjacent the upper end of said filter assembly and including an inlet valve for opening and closing said liquid inlet;

(d) a liquid outlet connected for draining filtered liquid from said internal filtered liquid passage through a bottom portion of said housing and including an outlet valve for opening and closing said liquid outlet;

(e) a drain in the lower end of said housing for draining off accumulated solids from the housing and including a drain valve for opening and closing said drain;

(f) a vacuum-break valve for providing exterior air into the interior of said housing when said vacuum-break valve is opened;

(g) a wash-down apparatus in the upper end of said housing for directing a wash liquid under pressure against an outer surface of said flexible fabric filter and including a wash-down valve for opening and closing said wash-down apparatus; and (h) a controller having a pressure differential sensor connected for sensing the pressure differential between the liquid outlet and the interior of said housing upstream of said fabric filter, said controller adapted to close said inlet and outlet valves and open said drain, vacuum-break, and wash-down valves to initiate a wash-down of said filter assembly when a predetermined pressure differential is attained, wherein said controller is adapted to open said vacuum-break valve after closing said inlet and outlet valves to cause the flexible fabric filter to pulse and thereby initially dislodge entrapped solid particles therefrom before said wash-down.

2. The filtering apparatus of claim 1 wherein said liquid inlet is a tangential inlet for imparting swirling cyclonic movement of liquid to be filtered within said housing.

3. The filtering apparatus of claim 2, said perforated cylinder being rigid, said filter assembly further including a standoff support disposed on the outer circumferential surface of said perforated cylinder, wherein said flexible fabric filter is supported on said standoff support whereby at least portions of said flexible fabric filter are prevented from contacting said perforated cylinder.

4. The filter apparatus of claim 3 wherein said standoff support includes a series of rods annularly spaced about the outer circumferential surface of said perforated cylinder in parallel with the axis of said cylinder.

5. The filtering apparatus of claim 2 wherein said wash-down apparatus includes a ring shower having an annular series of high pressure nozzles for directing a wash liquid under pressure against said outer surface of said flexible fabric filter.

6. The filtering apparatus of claim 2, said controller including a timer mechanism connected to said wash-down valve for disengaging said wash-down apparatus and closing said vacuum-break valve and said drain valve, and opening said inlet and outlet valves for reestablishing normal water filtering after a predetermined wash-down time.

7. The filtering apparatus of claim 6 including an automatic air vent valve connected to said inlet for venting air entrapped in said housing.

* * * * *